Aug. 6, 1968  D. P. HEARN  3,396,334
GEOPHYSICAL GRADIOMETER INCLUDING MEANS FOR DETERMINING
SPACING BETWEEN AIRBORNE BODIES
Filed March 9, 1966  2 Sheets-Sheet 1
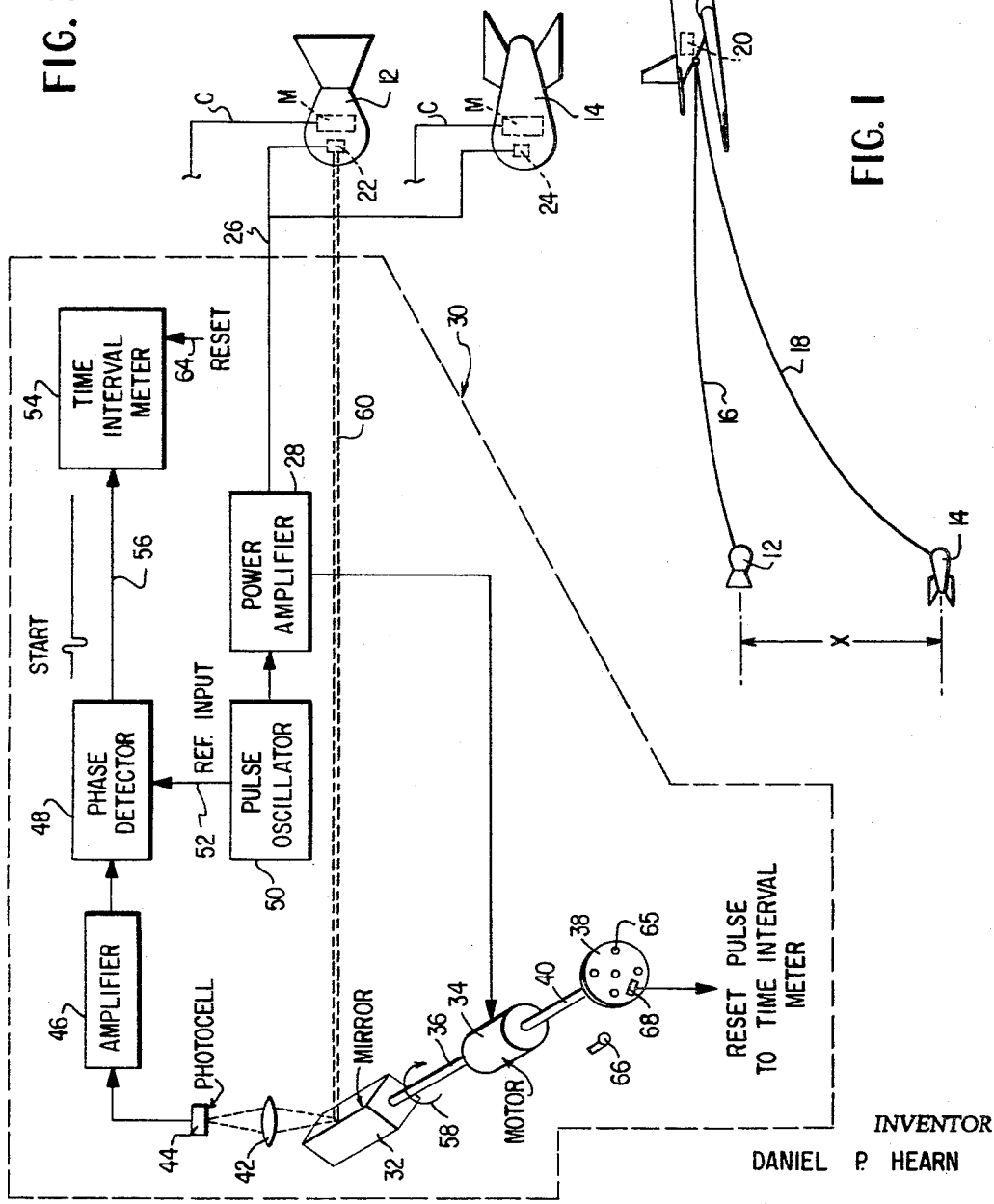
INVENTOR
DANIEL P. HEARN
BY McLean, Morton & Bonstead
ATTORNEYS.

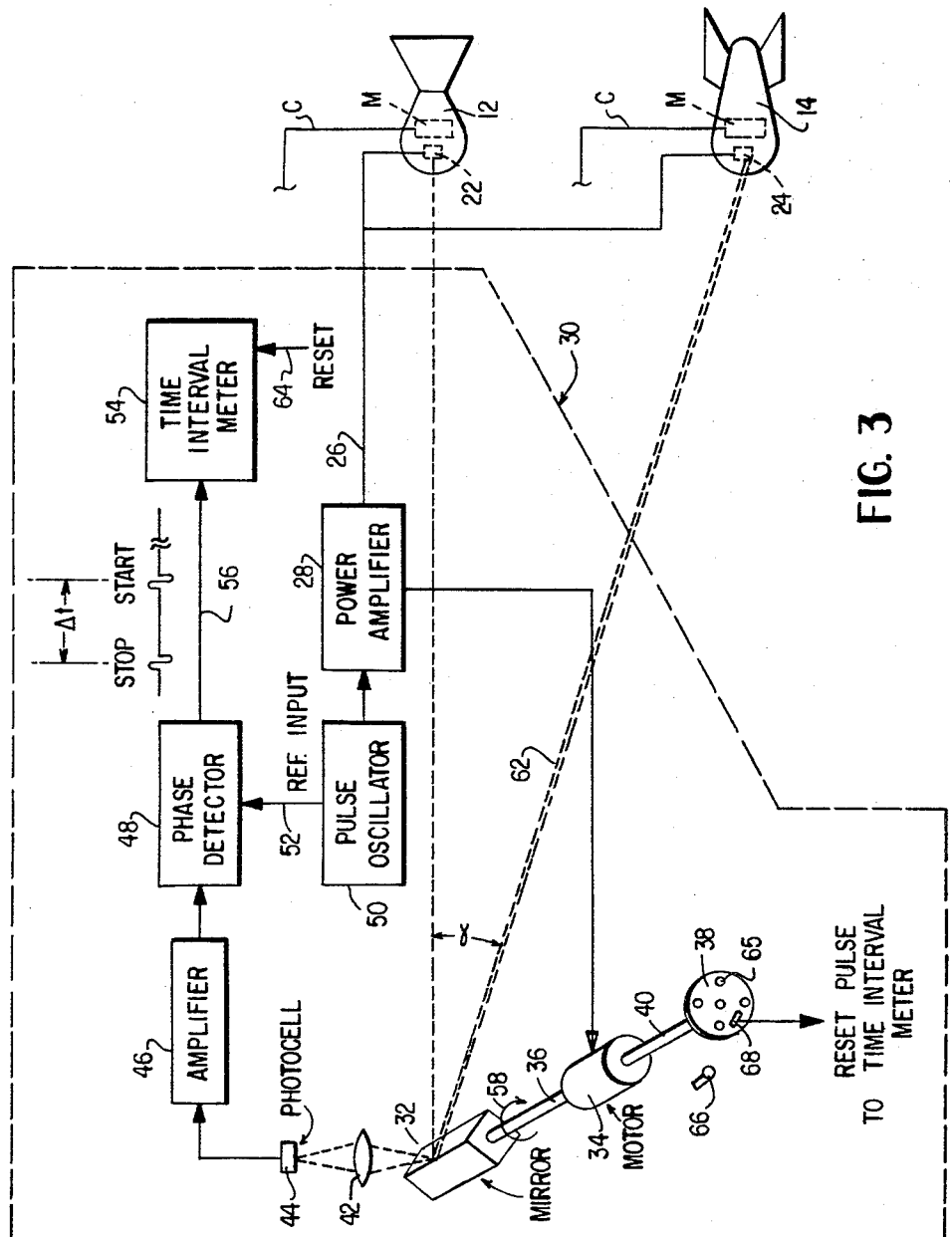

United States Patent Office 3,396,334
Patented Aug. 6, 1968

3,396,334
GEOPHYSICAL GRADIOMETER INCLUDING MEANS FOR DETERMINING SPACING BETWEEN AIRBORNE BODIES
Daniel P. Hearn, Tulsa, Okla., assignor, by mesne assignments, to Sinclair Research, Inc., New York, N.Y., a corporation of Delaware
Filed Mar. 9, 1966, Ser. No. 532,914
4 Claims. (Cl. 324—43)

This invention relates to an apparatus for assisting in electromagnetic geophysical prospecting with aircraft. The particular object of this invention is to improve, simplify, and render more reliable present geophysical methods and apparatus used for carrying out airborne electromagnetic surveys.

Certain airborne methods have been developed for geophysical prospecting in which the earth's magnetic field is measured. In general, these methods measure the earth's magnetic field with equipment mounted in an aerodynamic device, i.e., bird, towed below and/or behind an aircraft to indicate the existence of magnetic anomalies, e.g., ore deposits or petroleum deposits, in the earth's crust. The measurement of magnetic anomalies is, however, dependent upon time variations in the earth's magnetic field, the relative distance between the aircraft and the bird, the angle of the aircraft relative to the bird, etc., and variation in these factors can at times be indistinguishable from variations caused by the desired deposit in the earth's crust thereby providing serious sources of error and rendering results provided by such geophysical prospecting methods inconclusive.

In an effort to overcome these limitations, systems have been heretofore designed wherein two devices for measuring the earth's magnetic field, hereinafter referred to as magnetometers are used in combination. In these systems one magnetometer is arranged on the ground in the survey area and the measurement of this magnetometer provides a base for normal measurement in the area. The other magnetometer is towed over the survey area and when its measurements are compared or correlated with the measurement of the first magnetometer, the base or normal measurement of the first magnetometer assists in determining if a measured change in the earth's magnetic field is a natural time varying change or a change due to a change in the earth's magnetic susceptability from the existence of a magnetic anomalies. Although the use of such a base or normal measurement reduces the possibility of error, the errors are still present.

The present invention is directed to a system wherein these errors are eliminated or at least substantially reduced. In this system measurement of the earth's magnetic field is accomplished by measuring the difference between magnetic values at two positions along a component of the earth's magnetic field at the devices. For simplicity, this system will be described hereinbelow with regard to an arrangement suitable for measuring a vertical gradient along the vertical component of the earth's magnetic field. According to this system, two magnetometers are brought close together and the difference in the measurements at each instrument is obtained. If the distance between the two magnetometers is kept constant, this difference provides a magnetic gradient which indicates the presence of magnetic anomalies and is unaffected by natural time variations in the earth's magnetic field. In such a system for measuring a magnetic gradient, however, since the magnetometers are arranged in separate aerodynamic devices, the distance between the magnetometers will actually vary due to air currents, etc., and this distance variation must be corrected for to provide a magnetic gradient accurately representing the earth's magnetic field. This invention is more specifically directed to a device for measuring this distance.

This invention is particularly suitable for use with metastable helium magnetometers which are one of the latest devices for measurement of magnetic field intensity. Such magnetometers operates on the principle of optical pumping of helium and are well known in the art.

In general, the system wherein this invention is used comprises two magnetometers, each supported in a aerodynamic body or bird suspended by a cable behind an airplane. One of the birds is designed to have a high drag so that it will fly directly behind the airplane, whereas the other bird is weighted to fly beneath the airplane, e.g., approximately, 50 to 100 feet below the upper bird. Associated with each cable for suspending a bird are electrical conductors connecting the magnetometer in each bird to associated electrical apparatus in the airplane for amplifying and recording the desired measurements of the magnetic field. The device of this invention for measuring the distance between the two birds generally comprises a flashing light source placed in each of the birds and a mirror device in the airplane with associated apparatus in the airplane for applying a current pulse to the light sources and for rotating the mirror with a read-out system to measure the time that is required for the mirror to traverse the arc between reflecting light from the source in one of the birds and reflecting light from the source in the other bird. This time is proportional to the spacing between the birds. Factors which must be considered are that magnetic materials cannot be used in the device since they would effect the magnetometer readings. Also, direct current cannot be used since it produces a definite offset to the magnetic field which will give an erroneous reading in the magnetometer. Furthermore, the entire system for measuring the spacing between the two birds should preferably be small in size since such birds are in themselves relatively small and seldom exceed more than a foot in diameter and several, e.g., 1–3 feet in length. Much of the interior space is taken up with the magnetometer itself.

These and other objects and features of the invention will become apparent to those skilled in the art when taken in conjunction with the accompanying drawings, in which:

FIGURE 1 schematically illustrates the system of this invention;

FIGURE 2 is a diagrammatic view illustrating an embodiment of this invention with the mirror in one position; and FIGURE 3 is a diagrammatic view illustrating the second position of the mirror in the read-out system of this invention.

Referring now to FIGURE 1, airplane 10 will fly at a predetermined height above the ground, e.g., from about 500 to several thousand feet. When flying, the airplane will drag birds 12 and 14 by means of cables 16 and 18, respectively, which electrically connect the magnetometers M (see FIGURES 2 and 3) mounted in birds 12 and 14 and the electrical equipment 20 schematically shown in the airplane 10. The construction of bird 12 as shown provides a high drag characteristic so that the bird flies essentially behind the airplane, whereas the construction of bird 14 allows this bird to fly beneath the airplane according to conventional aerodynamic principles. The magnetic gradient discussed above is the difference in the magnetic field measured at the separate birds 12 and 14 divided by the spacing X between the birds. The spacing X is the distance desired to be measured in accordance with this invention. A system for measuring spacing X is illustrated in FIGURES 2 and 3.

Referring now to FIGURE 2, there are illustrated birds 12 and 14, each containing a magnetometer M as schematically illustrated electrically connected to the associated equipment 20 in airplane 10 (see FIGURE 3) by a conductor C in each case. Conductors C can, for example, be cables 16 and 18 respectively. The apparatus for measuring the spacing X between the birds 12 and 14 comprises light source 22 in bird 12 and light source 24 in bird 14, each light source being connected by electrical line 26 to a power amplifier 28 in airplane 10. Power amplifier 28 forms a part of the electrical apparatus 30 associated with the light sources for measuring the spacing X between birds 12 and 14 and applies a pulse to the light sources 22 and 24 to cause flashing thereof. Mirror 32 is supported on shaft 36 which is adapted to be rotated at a continuous known speed by motor 34. A reset pulse element 38 on shaft 40 is also rotated by motor 34 and operates as described in more detail hereinbelow. As mirror 32 rotates, it reflects light flashing from both light sources 22 and 24 represented by the dashed lines, to lens 42 which focuses the light on detector 44, e.g., a photocell. In operation, as the mirror revolves there is only one position of the mirror, which, as shown, has four flat sides, at which light from the respective light source 22 or 24 will be reflected to lens 42. Light which impinges on photocell 44 generates an electrical pulse corresponding to the time at which the light is reflected by mirror 32. FIGURES 2 and 3 show reflection of light from light sources 22 and 24 through lens 42 to photocell 44 in the respective positions of the mirror 32. The pulse created by cell 44 is amplified 46 and passed to phase detector 48 which is a control device. When power amplifier 28 pulses to flash the light 22 and 24, it does so at the control of pulse oscillator 50 since it is desired to flash the lights and read the spacing between birds 12 and 14 only during certain times, preferably those which correspond to the taking of a reading with magnetometers M in the birds 12 and 14. In fact, control oscillator 50 can also be used to command reading of the magnetometers. The oscillator 50 also applies a reference input 52 to the phase detector 48 which will detect only amplifier signals which are in phase to limit the number of pulses and the sequence of pulses passed to time interval meter 54. Since mirror 32 is revolving continuously and would, unless some limit were applied to the phase detector 48, apply a continuous sequence of pulses by all light picked up and reflected thereby, such a control system is desired. Phase detector 48 with its reference input 52 passes in-phase pulses as the mirror passes light reflected from source 22 or source 24. These pulses are represented by the start and stop symbols above the electrical line 56 connecting pulse detector 48 to time interval meter 54. As shown in FIGURE 2, the pulse leaving detector 48 is a start pulse which will initiate or start the time interval meter 54. Source 22 provides the start pulse since mirror 32 is revolving in the direction of arrow 58 and, accordingly, will traverse light beam 60, pulsed from light source 22, before it traverses light beam 62 from light source 24. FIGURE 3 illustrates reflection of light from source 24 by mirror 32 and, consequently, the pulse leaving detector 48 is a stop pulse which will indicate the time of stopping of the interval measured by meter 54 so that the time $\Delta t$ between the start pulse and stop pulse measures the arc or angle $\alpha$ traversed by the mirror 32. Since the speed of rotation of the motor 34 is known, the spacing X between birds 12 and 14 is easily determinable from the angle $\alpha$ and the known distances from plane 10 to birds 12 and 14. Time interval meter 54 is supplied with a reset input 64 to avoid a continual mixup of start and stop pulses if, for example, the system fails to receive one of the light sources, as the mirror 32 rotates and traverses light beams 60 and 62. Reset input 64 has a pulse applied thereto by reset device 38 for resetting of the time interval meter to read a second time interval between start-stop pulses. Device 38 comprises an optical disc, i.e., a disc having apertures therein corresponding with each face of the mirror 32. As the disc 38 rotates, light from source 66 passes through an individual one of the apertures 65 to impinge on photocell 68 to create a reset pulse which is applied to the reset input 64 of time interval meter 54.

The scanning mirror 32 is shown with four sides thus making a 90° scan when each face is used to provide a reading of the spacing X. A six-sided mirror making a 60° scan can, if desired, be used and many other variations are readily apparent. The use of a six-sided mirror providing a 60° scan would require the use of a disc 38 having six apertures therein corresponding to the individual sides of the mirror.

It is claimed:

1. In a system for measuring a magnetic gradient in the earth's magnetic field comprising an airplane, two aerodynamic bodies towed by said airplane at different heights with respect to the earth's surface, and at known distances behind said airplane, each of said aerodynamic bodies containing a device for measuring the earth's magnetic field, recording means in said airplane and means electrically interconnecting said devices and the recording equipment in said airplane, the improvement of means for measuring the spacing between said aerodynamic bodies comprising a light source in each of said aerodynamic bodies, means for pulsing said light sources to direct a light beam from each of said bodies toward said airplane including a power amplifier, and means for detecting said light beams and measuring the angle therebetween comprising a rotatable mirror, means for rotating said mirror at a known speed, said mirror being arranged to sequentially reflect said light beams from the individual sources, pulse means for creating separate electrical pulses corresponding to said reflected light beams and means for measuring the time between said separate pulses as a measure of the angle between said light beams whereby the spacing between said two aerodynamic bodies is determined from said angle and the known distances to said bodies so that spacing variations may be determined to provide magnetic gradient measurements accurately representing the earth's magnetic field.

2. The device of claim 1 wherein said pulse means comprises a photocell, said reflected light impinging upon said photocell to create said pulse, a phase detector, means for applying said pulses to said phase detector, a pulse oscillator for controlling said power amplifier and for applying a reference input to said phase detector, and a time interval meter, the output of said phase detector being applied to said time interval meter, said meter measuring the time interval between said pulses, said angle being determinable from said time and the known rotational speed of said mirror.

3. The device of claim 2 wherein said mirror has a plurality of reflective faces thereon and said time interval meter has a reset input, and further including means for applying a reset pulse to said reset input comprising a disc rotating with said mirror and having an aperture therethrough corresponding to each face of said mirror, a light source for passing light through said apertures sequentially as the disc rotates and photocell upon which said light impinges for creating a reset pulse for resetting of said time interval meter as each mirror face rotates and reflects light from said aerodynamic bodies, and means for applying said reset pulse to said reset input means.

4. The device of claim 3 wherein said mirror has four reflective faces.

References Cited

UNITED STATES PATENTS 2,955,251   10/1960   Shaw et al.

RUDOLPH V. ROLINEC, *Primary Examiner.*

P. URIBE, *Assistant Examiner.*